United States Patent
Nainar et al.

(10) Patent No.: US 10,924,369 B2
(45) Date of Patent: Feb. 16, 2021

(54) TRAFFIC AWARE OPERATIONS, ADMINISTRATION, AND MAINTENANCE (OAM) SOLUTIONS FOR INTERNET OF THINGS (IOT) NETWORKS

(71) Applicant: Cisco Technology, Inc., San Jose, CA (US)

(72) Inventors: Nagendra Kumar Nainar, Morrisville, NC (US); Lionel Florit, Greenbrae, CA (US); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/682,759

(22) Filed: Nov. 13, 2019

(65) Prior Publication Data

US 2020/0366585 A1    Nov. 19, 2020

Related U.S. Application Data

(60) Provisional application No. 62/847,241, filed on May 13, 2019.

(51) Int. Cl.
*H04L 12/26* (2006.01)
*H04L 29/08* (2006.01)
*H04L 12/24* (2006.01)

(52) U.S. Cl.
CPC .......... *H04L 43/0811* (2013.01); *H04L 41/12* (2013.01); *H04L 43/103* (2013.01); *H04L 67/12* (2013.01)

(58) Field of Classification Search
CPC ... H04L 43/0811; H04L 67/12; H04L 43/103; H04L 41/12
See application file for complete search history.

(56) References Cited

U.S. PATENT DOCUMENTS

| | | | |
|---|---|---|---|
| 9,509,584 B2 | 11/2016 | Bugenhagen | |
| 10,433,248 B2 * | 10/2019 | Wang | H04L 67/12 |
| 10,491,411 B2 * | 11/2019 | Bartier | H04L 67/12 |
| 10,594,585 B2 * | 3/2020 | Ganster | H04L 67/125 |

(Continued)

FOREIGN PATENT DOCUMENTS

WO    WO 2019/055947 A1 *    3/2019    ............ H04W 48/14

OTHER PUBLICATIONS

Sterle et al., "Application-Driven OAM Framework for Heterogeneous IOT Environments," journals.sagepub.com, Jan. 18, 2016, pp. 1-9.

*Primary Examiner* — Patrice L Winder
(74) *Attorney, Agent, or Firm* — Polsinelli PC

(57) ABSTRACT

Systems, methods, and computer-readable media for Operations, Administration, and Maintenance (OAM) in Internet of Things (IoT) network include an maintaining a list of one or more IoT devices connected to an IoT gateway in the IoT network. At least a subset of the one or more IoT devices are classified as belonging to an active list based on receiving traffic from at least the subset of the one or more IoT devices, and OAM probes are suppressed to at least the subset of the one or more IoT devices in the active list. A message can be received in response to the OAM probe from the at least one IoT device, and upon receiving the message, the at least one IoT device is classified as belonging to the active list.

20 Claims, 8 Drawing Sheets

(56) References Cited

U.S. PATENT DOCUMENTS

| | | | |
|---|---|---|---|
| 2011/0153655 A1* | 6/2011 | Kim | H04L 67/12 |
| | | | 707/769 |
| 2017/0195424 A1 | 7/2017 | Nasir et al. | |
| 2018/0351793 A1 | 12/2018 | Hunter et al. | |
| 2019/0028375 A1* | 1/2019 | Kandula | H04L 43/10 |
| 2019/0089651 A1 | 3/2019 | Pignataro et al. | |
| 2020/0304589 A1* | 9/2020 | Isberg | H04L 67/145 |

* cited by examiner

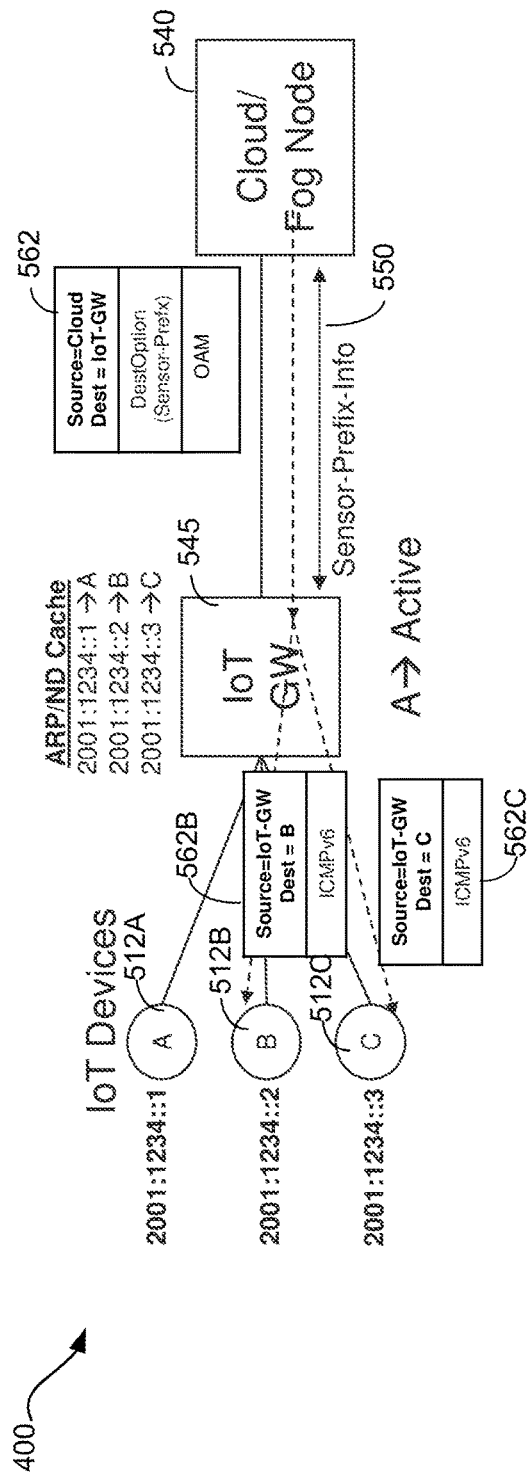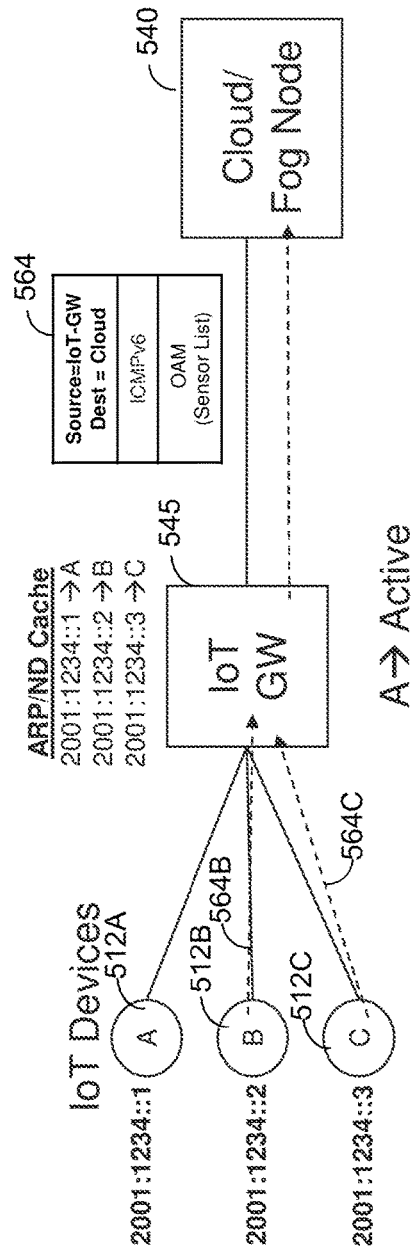
FIG. 5A
FIG. 5B

TRAFFIC AWARE OPERATIONS, ADMINISTRATION, AND MAINTENANCE (OAM) SOLUTIONS FOR INTERNET OF THINGS (IOT) NETWORKS

CROSS-REFERENCES TO RELATED APPLICATIONS

This application claims the benefit of U.S. Provisional Application No. 62/847,241, filed May 13, 2019, which is hereby incorporated by reference, in its entirety and for all purposes.

TECHNICAL FIELD

The subject matter of this disclosure relates in general to the field of Operations, Administration, and Maintenance (OAM) in Internet of Things (IoT) networks. More specifically, example aspects are directed to traffic aware OAM solutions for IoT networks.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

As such, increasing development in IoT technologies will lead to numerous IoT devices surrounding a user at home, in vehicles, at work, and many other locations. For example, hundreds of consumer IoT devices, such as, appliances, TVs, light fixtures, air conditioners, music systems, garage door, home security system, fans, sprinkler system, microwave oven, oven, dishwasher, clothes washer and dryer, etc., may be configured as IoT device. Similarly, in an industrial setting, various machines, drones, robots, user equipment, computing systems, actuators, etc., can be controlled through IoT techniques. The use of IoT technology is known and ever expanding in various environments.

However, IoT applications face several challenges with respect to the management and deployment of IoT devices. Some of these challenges include a lack of reliable infrastructure for determining and analyzing lost IoT messages, path travelled by messages generated by IoT devices, determining activity or inactivity of IoT devices, determining network and transit performance of IoT traffic, determining failure nodes in multi-hop transit paths, etc. Thus there is a need for improved Operations, Administration, and Maintenance (OAM) solutions to address these challenges and provide platforms for monitoring network conditions and device status in IoT deployments.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 5A-B illustrate systems and associated processes for traffic aware OAM solutions in an IoT network, in accordance with some examples;

DETAILED DESCRIPTION

Figure 1:
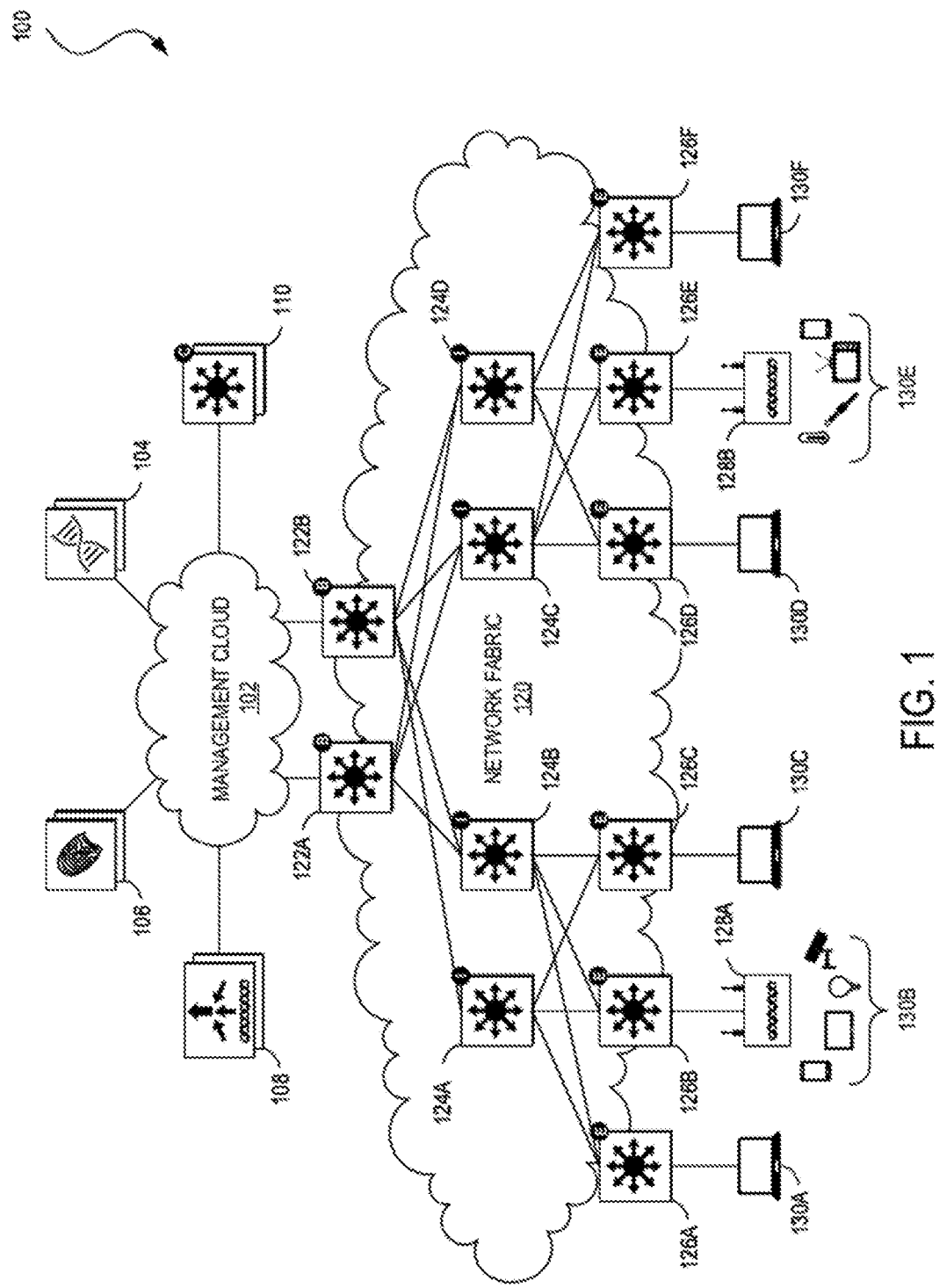
FIG. 1 illustrates a topology of an enterprise network in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

IoT devices such as sensors deployed in various environments may be battery powered, and so energy conservation is an important goal. Intermediate nodes in a multi-hop IoT network, such as IoT gateways, to which the end IoT devices establish direct connections may also be power sensitive in some deployments. The improved Operations, Administration, and Maintenance (OAM) functions implemented by cloud nodes or intermediate fog nodes in a multi-hop IoT network may utilize probes to perform connectivity or continuity checks on the IoT devices. These probes to the sensors may be directed through the IoT gateways. The OAM functions such as the probes can involve power-hungry activities to be performed by the IoT devices. For example, the IoT devices consume power for waking up from a nascent sleep mode, and subsequently preparing and transmitting appropriate responses to the probes. The IoT gateways also consume power in performing the OAM functions. For example, the IoT gateways may consume power in analyzing the probes received from a cloud node, directing or channeling the probes appropriately to the IoT devices identified by the probes, receiving the responses from the IoT devices and forwarding them to the next intermediate node such as the fog nodes. Power conservation is an important goal for both the IoT devices as well as for IoT gateways, among other components of an IoT network.

In some examples, traffic aware OAM solutions are provided to reduce the OAM traffic as well as related power consumption, e.g., by the IoT devices, the IoT gateways, and other components of an IoT network. In some examples, the IoT gateway is a first hop node or a node to which one or more end devices such as sensors or other IoT devices are directly connected (i.e., through a single hop). The IoT gateway can collect the source addresses (e.g., internet protocol (IP) addresses) of the IoT devices connected to the IoT gateway and port or offload this information to a fog node of the IoT network.

The fog node can similarly receive the source addresses from several such IoT gateways for IoT devices that the several IoT gateways are connected to. The fog node can track activity within configurable and scalable windows for a plurality of IoT devices connected to a plurality of IoT gateways. The fog node can maintain an active list of IoT devices, where the active list includes IoT devices from which transit activity was received or observed by the fog node during the window. The fog node can maintain a passive list which includes the remaining IoT devices. The fog node can then direct OAM probes through respective IoT gateways to only the IoT devices in the passive list. This way, the OAM traffic and related power consumption is reduced because only the IoT devices in the passive list need to process and respond to the probes. The IoT gateways can direct and manage the OAM traffic for the reduced number of IoT devices in the passive list, rather than for all of the IoT devices. Upon receiving an expected response from a IoT device in the passive list, that IoT device can be moved to the active list. This way, the fog node can reduce unnecessary or redundant OAM probes for the IoT devices which the fog node may have determined to be active, connected, or functioning as expected.

In some alternative implementations, the IoT gateway can maintain the lists of active and passive IoT devices among the IoT devices that the IoT gateway is directly connected to. These active and passive lists can also be updated within configurable time windows. The IoT gateway can then forward OAM probes from the fog node or a cloud node to the IoT devices in the passive list, but not to the IoT devices in the active list. The IoT gateway can also provide information regarding the source addresses of the IoT devices, and the active and passive lists of IoT devices to the fog node or cloud node and continually provide updated information to the fog node or cloud node (or generally, an originator node of the OAM probes).

Disclosed herein are systems, methods, and computer-readable media for Operations, Administration, and Maintenance (OAM) in Internet of Things (IoT) network, which include maintaining a list of one or more IoT devices connected to an IoT gateway in the IoT network. At least a subset of the one or more IoT devices are classified as belonging to an active list based on receiving traffic from at least the subset of the one or more IoT devices, and OAM probes are suppressed to at least the subset of the one or more IoT devices in the active list. A message can be received in response to the OAM probe from the at least one IoT device, and upon receiving the message, the at least one IoT device is classified as belonging to the active list.

In some examples, a method is provided. The method includes maintaining a list of one or more Internet of Things (IoT) devices connected to an IoT gateway in an IoT network; classifying at least a subset of the one or more IoT devices as belonging to an active list based on receiving traffic from at least the subset of the one or more IoT devices; and suppressing Operations, Administration, and Maintenance (OAM) probes to at least the subset of the one or more IoT devices in the active list.

In some examples, a system is provided. The system, comprises one or more processors; and a non-transitory computer-readable storage medium containing instructions which, when executed on the one or more processors, cause the one or more processors to perform operations including: maintaining a list of one or more Internet of Things (IoT) devices connected to an IoT gateway in an IoT network; classifying at least a subset of the one or more IoT devices as belonging to an active list based on receiving traffic from at least the subset of the one or more IoT devices; and suppressing Operations, Administration, and Maintenance (OAM) probes to at least the subset of the one or more IoT devices in the active list.

In some examples, a non-transitory machine-readable storage medium is provided, including instructions configured to cause a data processing apparatus to perform operations, the operations including maintaining a list of one or more Internet of Things (IoT) devices connected to an IoT gateway in an IoT network; classifying at least a subset of the one or more IoT devices as belonging to an active list based on receiving traffic from at least the subset of the one or more IoT devices; and suppressing Operations, Administration, and Maintenance (OAM) probes to at least the subset of the one or more IoT devices in the active list.

Some examples of the methods, systems, and non-transitory machine-readable storage media comprise classifying at least the subset of the one or more IoT devices as belonging to the active list during a time period and suppressing the OAM probes to at least the subset of the one or more IoT devices in the active list during the time period.

Some examples of the methods, systems, and non-transitory machine-readable storage media, further comprise directing an OAM probe to at least one IoT device of the one or more IoT devices, the at least one IoT device not belonging to the subset of the one or more IoT devices.

Some examples of the methods, systems, and non-transitory machine-readable storage media, further comprise receiving a message in response to the OAM probe from the at least one IoT device, and upon receiving the message, classifying the at least one IoT device as belonging to the active list.

In some examples of the methods, systems, and non-transitory machine-readable storage media, maintaining the list of the one or more IoT devices connected to the IoT gateway comprises maintaining a list of source addresses of the one or more IoT devices in a cache of the IoT gateway.

Some examples of the methods, systems, and non-transitory machine-readable storage media, further comprise forwarding the cache to an intermediate node of the IoT network, wherein the classifying is performed at the intermediate node, the intermediate node comprising a cloud node or a fog node; and receiving, from the intermediate node, at least one OAM probe for at least one IoT device not in the active list.

Some examples of the methods, systems, and non-transitory machine-readable storage media, further comprise receiving, at the IoT gateway, one or more OAM probes from an intermediate node, the intermediate node comprising a cloud node or a fog node; and suppressing, at the IoT gateway, at least one OAM probe of the one or more OAM probes, the at least one OAM probe for at least one IoT device not in the active list.

This overview is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DESCRIPTION OF EXAMPLE EMBODIMENTS

Disclosed herein are systems, methods, and computer-readable media for Operations, Administration, and Maintenance (OAM) in an Internet of Things (IoT) network. One or more lists of IoT devices connected to at least one IoT gateway are maintained. Based on traffic received from at least a subset of the IoT devices within a time period, a subset of the IoT devices are placed in an active list, and the remaining IoT devices are placed in a passive list. OAM probes are directed to IoT devices in the passive list but not to IoT devices in the active list during the time period. In some examples, the list of IoT devices and associated source addresses of the IoT devices are determined by the at least one IoT gateway and forwarded to a fog node or cloud node, where the fog node or cloud node maintains the active list and the passive list and directs the OAM probes to IoT devices in the passive list but not to IoT devices in the active list during the time period. In some examples, the list of IoT devices and associated source addresses of the IoT devices are determined by the at least one IoT gateway, where the at least one IoT gateway maintains the active list and the passive list and directs the OAM probes received from a fog node or cloud node to IoT devices in the passive list but not to IoT devices in the active list during the time period FIG. 1 illustrates an example of a physical topology of a network 100 which may be configured according to aspects of this disclosure. For example, the network 100 can provide an infrastructure for an IoT network with OAM solutions configured according to disclosed aspects. In one example, the network 100 may provide intent-based networking in an enterprise network. It should be understood that, for the network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the network 100 can include any number or type of resources, which can be accessed and utilized by endpoints or network devices. The endpoints or network devices can be spread apart geographically and cover many domains which can have their own context-based data access rules and requirements. The illustrations and examples provided herein are for clarity and simplicity.

In this example, the network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., Virtual Extensible Local Area Network or "VXLAN") from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. In some examples, the endpoints 130 can include various Internet-connected devices which can be deployed in the computing devices. For example, the endpoints 130 can include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints'

Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow. In some examples, a logical architecture for the network 100 can be implemented to include functions related to management, control, network fabric, physical layer, and shared services for the network 100.

Figure 2:
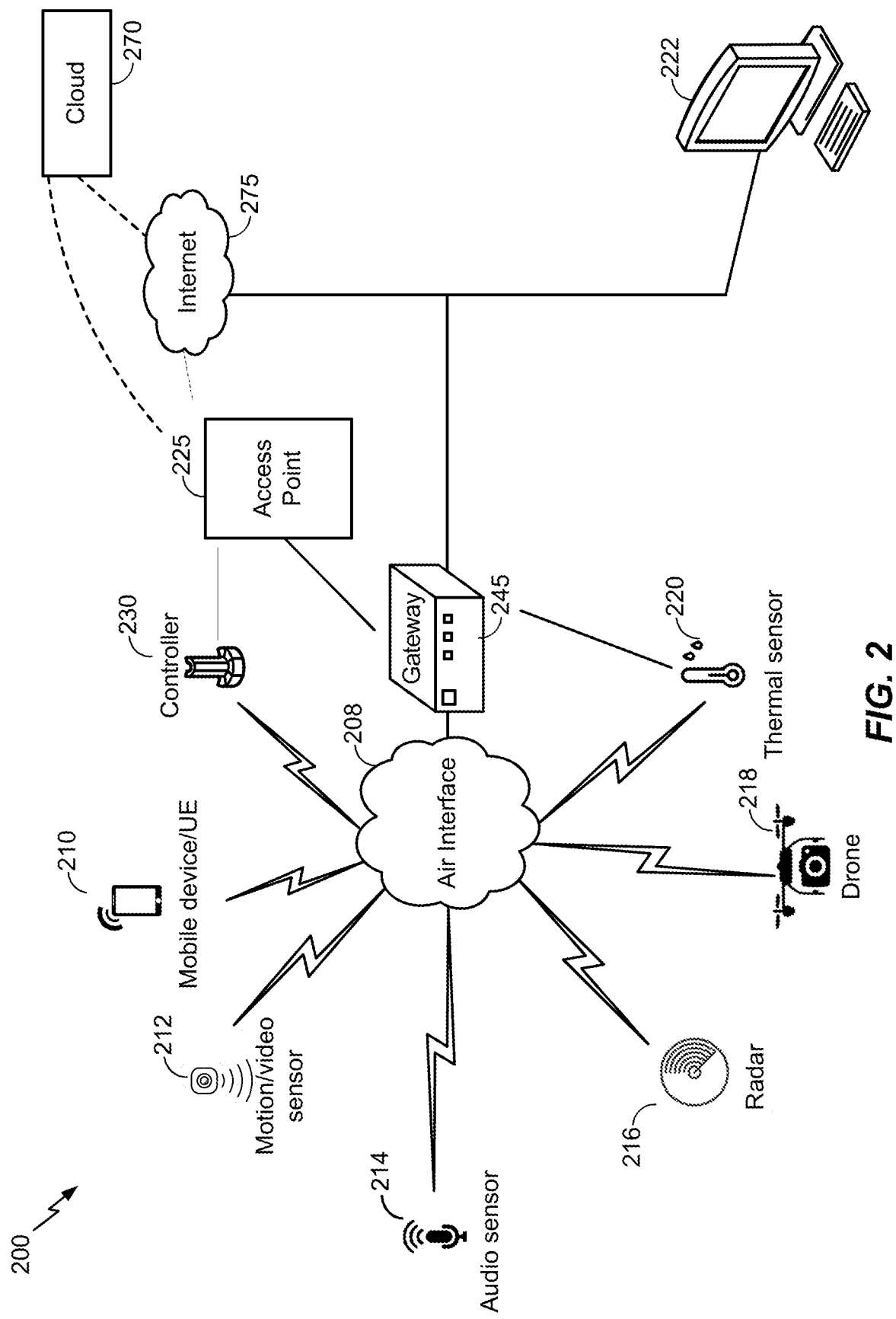
FIG. 2 illustrates an IoT network which can be configured to include the OAM solutions, in accordance with some examples.

FIG. 2 illustrates an example topology of a network 200 which may be configured to include one or more OAM solutions according to aspects of this disclosure. In some aspects, the network 200 can be implemented using the network fabric, management, and/or architecture described with reference to the network 100 of FIG. 1. In some examples, the network 200 can include or support IoT interconnections and traffic.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. In some examples, an IoT device can include a sensor, and as such the IoT device may be referred to as a sensor based on its functionality. In various examples, an IoT device may have a passive communication interface, such as a quick response (QR) code, a radio-frequency identification (RFID) tag, an NFC tag, or the like, or an active communication interface, such as a modem, a transceiver, a transmitter-receiver, or the like. In some examples, an IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. In some examples, references may be made more generally to "connected devices", which can include devices such as IoT devices or other devices which can connect to a network and whose operations can be controlled remotely over the network.

In some aspects, the network 200 can support wireless communications among a plurality of IoT devices and other endpoint devices. For example, a mobile phone 210, motion or video sensor 212, microphone or audio sensor 214, radar 216, drone 218, thermal imager or thermal sensor 220, etc., are shown as examples of the types of devices which may be connected to the network 200 through one or more hops or links. One or more of the devices 210-220 can communicate with a gateway 245 which can include an IoT gateway in some examples. Some devices can connect to an access point 225 (e.g., such as a WLC 108) over an air interface 208 through a controller 230. The gateway 245 may also connect to the access point 225 or other node, as will be explained with reference to FIG. 3. The air interface 208 can comply with a wireless Internet protocol (IP), such as IEEE 802.11. Internet 275 includes a number of routing agents and processing agents (not shown in FIG. 2 for the sake of convenience) and can include a global system of interconnected computers and computer networks that uses a standard Internet protocol suite (e.g., the Transmission Control Protocol (TCP) and IP) to communicate among disparate devices/networks.

In example aspects, remote access to the devices 210-220 may be enabled through the Internet 275 through the use of the gateway 245 and/or one or more controllers such as the controller 230. In some aspects, the controller 230 can generally observe, monitor, control, or otherwise manage the various other components in the network 200. For example, the controller 230 can communicate with the access point 225 to interact with the devices 210-220, where such interactions can include monitoring or managing attributes, activities, or other states associated with the various devices 210-220.

A computer 222, such as a desktop or personal computer (PC), is shown as connecting to Internet 275 directly (e.g., over an Ethernet connection or Wi-Fi or 802.11-based network). The computer 222 may alternatively, or additionally, have a wired connection to Internet 275 or the computer 222 may be connected directly to the access point 225. Although illustrated as a desktop computer, the computer 222 may be a laptop computer, a tablet computer, a PDA, a smart phone, or the like. In some examples, the computer 222 can include a cloud computing system or a system of two or more computers acting in coordination. In some examples, a cloud node 270 can be include one or more cloud computing devices which can be configured according to the network 100 of FIG. 1.

In some examples, one or more of the devices 210-220 can be remote devices deployed in an environment where monitoring the operational status of the devices 210-220 may be desirable. For example, some of the devices 210-220 may be battery powered. In some examples, one or more of the devices 210-220 can be connected through the air interface 208 to the gateway 245 where the quality of the connection can be dependent on various environmental factors, signal strengths, respective distances between the devices 210-220 and the gateway 245, presence of any obstacles or interferences, etc. In various examples, it may be desirable to monitor the activity or inactivity of the devices 210-220, their connection status, bandwidth usage, traffic flow, etc. In some examples, OAM probes or other status checks can be used to perform OAM activities on the devices 210-220. In some examples, IoT applications which may utilize the information obtained from the devices 210-220 can obtain enhanced visibility of the IoT network by using such probes to analyze messages sent by particular IoT devices, their paths traveled, potential message losses, etc. In some examples, one or more intermediate nodes (e.g., cloud nodes, edge nodes, fog nodes, etc.) can also utilize such probes. In some examples, the probes can be used to obtain periodic measures of key performance indicators (e.g., loss, jitter, throughput, etc.). In some examples, troubleshooting operations can be performed using the probes to identify where messages may be lost, capture and display the content of specific messages of interest transiting on the IoT network, etc. In some examples, the information collected by using the probes can also provide analytics based on characterizing expected or normal operating conditions for the IoT devices. Further, the analytics can be used to provide alerts to a system administrator on any unexpected network behavior, losses, etc.

However, it is recognized that the probes may incur power and other resource expenditure (e.g., bandwidth). For example, as previously noted, the various IoT network elements involved in an OAM activity may consume resources in one or more activities associated with creating the probes, forwarding the probes, processing and responding to the probes, forwarding the responses, processing the responses, etc. While it is possible that one or more of the devices 210-220 can include battery powered devices, in some deployments even the IoT gateway 245 may be power restrained (e.g., include battery power, solar power or other power sources).

Figure 3:
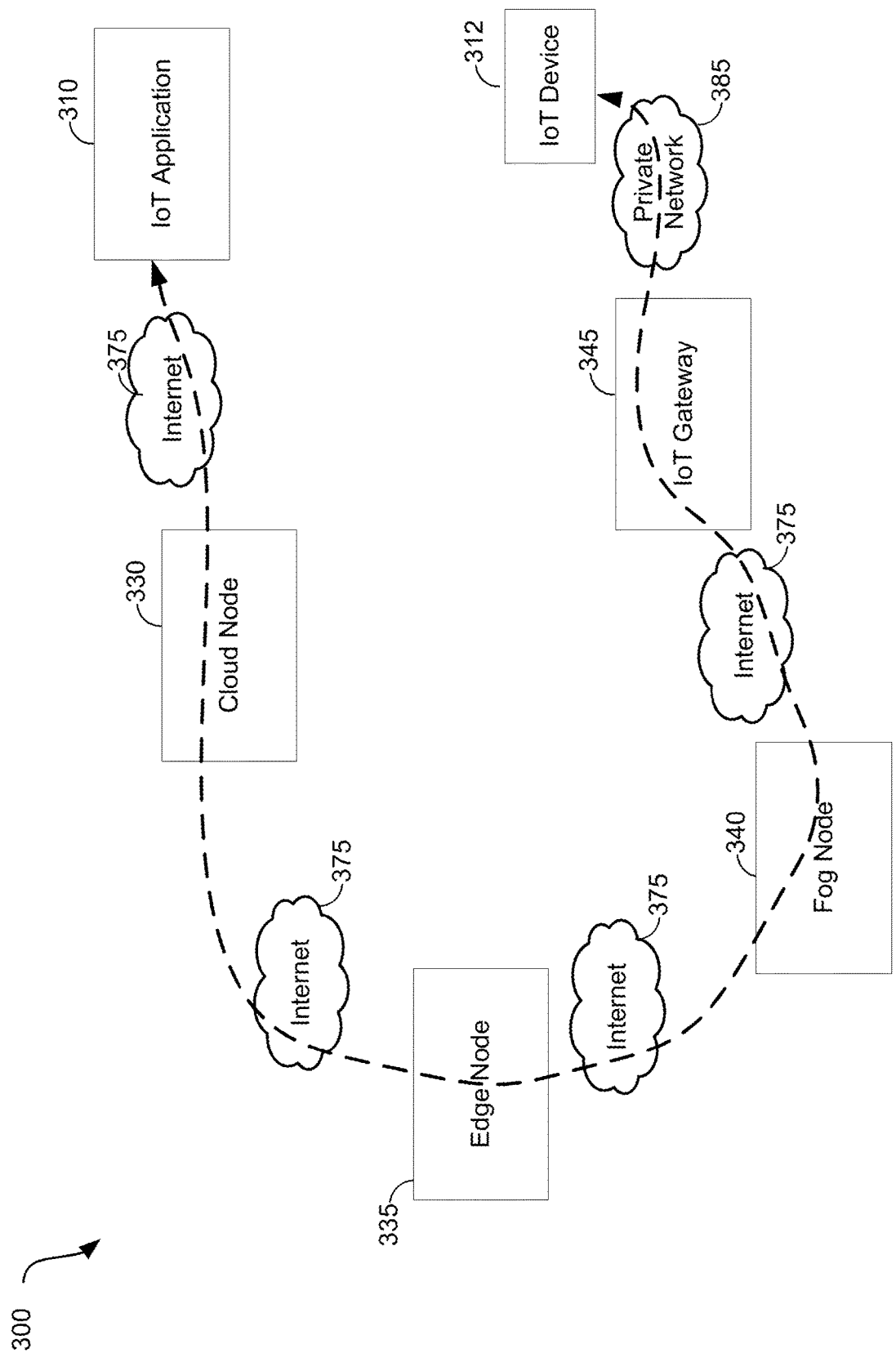
FIG. 3 illustrates a system which supports an IoT network, in accordance with some examples.

According to various examples, improved OAM solutions are implemented at one or more nodes of an IoT network node. For example, a multi-hop connection between an IoT application executed on the computer 222 (e.g., to control one or more of the devices 210-220) can involve one or more nodes in an IoT message chain. For example, an end-to-end communication path between an IoT Application and one or more of the devices 210-220 can include one or more cloud components, fog nodes, IoT gateways, etc. FIG. 3 illustrates an example of such a communication path in a multi-hop communication.

FIG. 3 illustrates an example network 300 which can be utilized for IoT communication between an IoT application 310 and an IoT device 312. In some examples, the IoT application 310 can include programs and functions for controlling a "smart" or IoT appliance 312. The IoT appliance 312 can include any of the devices 210-220 or other IoT device which may be remotely operated and have the ability to perform functions and communicate using IoT technology. Internet 375 shows a general medium which enables end-to-end communication, which can include or cooperate with a private network 385. As shown, there may be a cloud node 330, an edge node 335, a fog node 340, and an IoT gateway 345 in the communication path.

In some examples, once the IoT appliance 312 is powered on or enabled for communication with the Internet 375 or private network 385, the IoT appliance 312 can be connected to the IoT network using one or more processes which can include a discovery process where the IoT appliance 312 may be discovered by the network 300, one or more processes for security and identification for authentication of the IoT appliance 312, exchange of one or more test messages to ensure the end-to-end connectivity, and various other processes which may be employed for specific communication mechanisms and protocols which may be involved. OAM checks can be used to determine whether the IoT appliance 312 has been powered on and the connections have been successfully established. Further, once the IoT appliance 312 can be operational and capable of connecting to the network, OAM checks can also reveal any problems which can be encountered in any hop or leg of the communication path between the IoT application 310 and the IoT appliance 312.

Figure 4A:
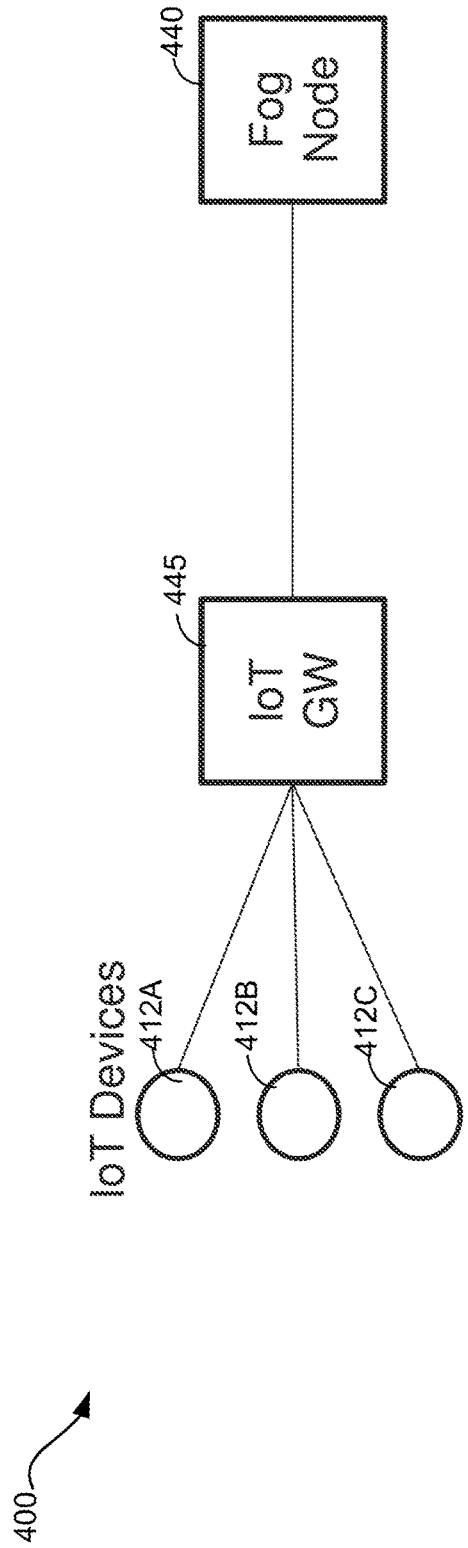
FIGS. 4A-B illustrate systems and associated processes for traffic aware OAM solutions in an IoT network, in accordance with some examples.
Figure 4B:
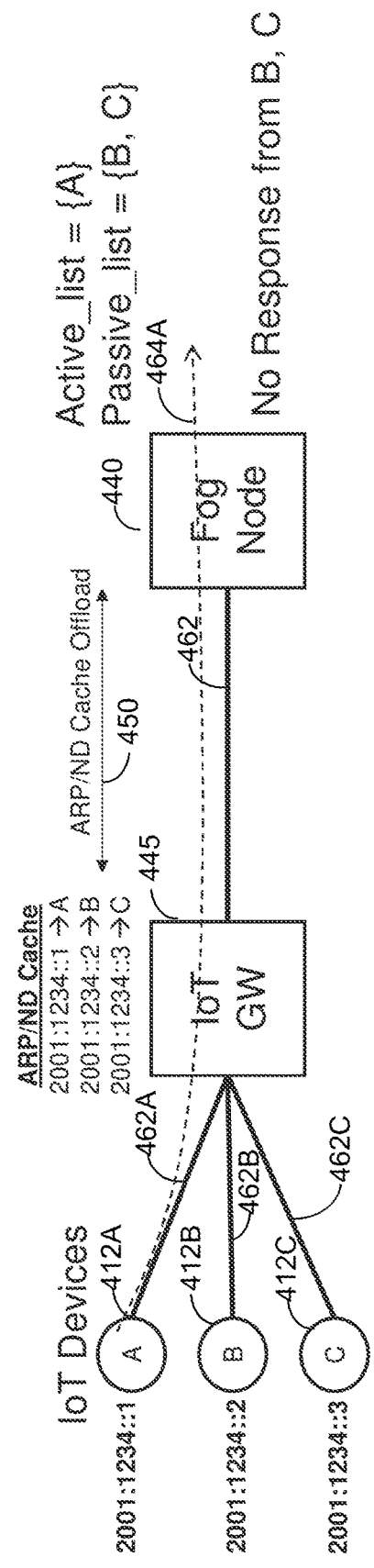

FIGS. 4A-B illustrate a system 400 configured to implement OAM solutions according to this disclosure. For example, system 400 can include an IoT network such as the network 300. Relevant aspects of the system 400 as shown in FIGS. 4A-B include IoT devices 412A-C, an IoT gateway 445, and a fog node 440. The IoT devices 412A-C can include one or more sensors, and or other devices such as the devices 210-220 of FIG. 2 or the IoT appliance 312 of FIG. 3. Similarly, the IoT gateway 445 can include functionality similar to the IoT gateway 245 of FIG. 2 or the IoT gateway 345 of FIG. 3; and the fog node 440 can include functionality which is similar to the fog node 340 of FIG. 3.

In some examples, the IoT devices 412A-C can be directly connected to the IoT gateway 445 in the sense that the IoT gateway 445 may include a first hop with no intermediate nodes in the IoT network between the IoT devices 412A-C and the IoT gateway 445. The IoT gateway 445 can include an Address Resolution Protocol (ARP) and Neighbor Discovery (ND) cache. The ARP/ND cache can include a collection of ARP entries that are created for the IoT devices 412A-C when they are connected and have their IP addresses resolved. For example, FIG. 4B shows example IP addresses identified for each of the IoT devices 412A-C. These IP addresses are also indicated under the ARP/ND cache identifier in conjunction with the IoT gateway 445. Using the ARP/ND cache or other mechanism, the IoT gateway 445 may track the IoT devices which are connected to the IoT gateway 445, such that those IoT devices may be monitored. The ARP/ND cache can be updated when new IoT devices are connected to or attached to the IoT gateway 445 as well as when any existing IoT devices are no longer connected or attached to the IoT gateway 445.

In some examples, the ARP/ND cache can be offloaded or transported to the fog node 440 (or any other intermediate node of the IoT network) in a step 450. For example, an out-of-band (OOB) channel which may not interfere with other IoT traffic can be used for offloading the ARP/ND cache to the fog node 440. In some examples, the IoT gateway 445 can use an open source framework such as gRPC or a YANG model for transporting the ARP/ND cache to the fog node 440. The step 450 can be repeated when there are any updates to the ARP/ND cache.

In some examples, the fog node 440 can receive the ARP/ND cache and store the IP addresses locally or update local records at the fog node 440 to reflect the latest set of IoT devices 412A-C connected to the IoT gateway 445. The fog node may similarly receive the list of connected IoT devices from various other IoT gateways (if any) in the IoT network implemented by the system 400.

The fog node 440 can conduct OAM related functions on the IoT devices connected to the different IoT gateways using a configurable time period. In an example, a traffic window can be defined (e.g., 10 second duration) during which the fog node 440 can identify which ones of the IoT devices 412A-C connected to the IoT gateway 445 pass an OAM test or probe. For example, the OAM test can be used to identify whether the IoT devices 412A-C are active and functioning well or are passive and may need further investigation.

In some examples, at least two lists can be maintained for the IoT devices connected to each IoT gateway (or a common set of two lists can be used for several IoT gateways if applicable). As shown, the fog node 440 can maintain an active list and a passive list. The active and passive lists can be updated upon conducting OAM probes. For example, the fog node, having obtained the ARP/ND cache from the IoT gateway 445 in the step 450 would have the list of IP addresses for the IoT devices 412A-C. The fog node 440 may send an OAM probe 462 to the IoT gateway 445 and instruct the IoT gateway 445 to forward the respective OAM probes 462A-C to the IoT devices 412A-C. The IoT gateway 445 may forward any response received from the IoT devices 412A-C back to the fog node 440.

Each of the IoT devices 412A-C, upon receiving their respective OAM probes 462A-C can wake up (if they are in sleep mode) to the extent that may be necessary to generate a response. For example, the OAM probes 462A-C can involve liveliness checks to determine whether the IoT devices 412A-C are operational and connected to the IoT network. There may be specific processes and protocols in place for responding to these checks. For example a response message including the IoT device's identifier or IP address can be generated using a memory which may remain powered on even if the IoT device is in sleep mode. In the illustrated example, the IoT device 412A may generate a message 464A which may be in response to the OAM probe 462A. In some examples, the message 464A may include any other traffic which may be originating from or generated by the IoT device 412A even if it is not in response to the OAM probe 462A.

In some examples, the message 464A is received by and forwarded from the IoT gateway 445 to the fog node 440. Upon receiving the message 464A, the fog node 440 can identify that the message 464A was received from the IoT device 412A based on the IP address which is either contained in the message 464A or identified by the IoT gateway 445 as such. The fog node 440 may add the IoT device 412A to the active list for that time period during which the message 464A was received.

During the time period, the remaining IoT devices 412B-C may not generate a response or any other message. Upon not detecting any message from the remaining IoT devices 412B-C may be moved to the passive list for the time period.

In some examples, the fog node 440 may send subsequent OAM probes directed to the IoT devices 412B-C in the passive list but not to the IoT device 412A which is in the active list during the time period. Since the fog node 440 is already aware that the IoT device 412A has been active within that time period, the fog node 440 can avoid any subsequent OAM probes to the IoT device 412A as these may be redundant. Upon receiving a response or message from any of the IoT devices 412B-C, the respective IoT devices can be moved to the active list. This way, significant power savings and efficiencies can be realized by avoiding OAM probes for IoT devices which have been determined to be active and in good functioning order for a specified duration of time. The active and passive lists can be updated for subsequent time periods or intervals.

In some examples, the fog node 440 can also consult the IoT gateway 445 to identify any active IoT devices which may already have been identified for a particular time period. For example, an MQ telemetry transport (MQTT) broker associated with the IoT gateway 445 may include a log of IoT devices from which messages may have been received during a time period. These devices can be moved into the active list of the fog node 440 in some examples in addition to or in lieu of receiving an explicit indication through a message such as the message 464A about the activity of the IoT device 412A, for example.

FIGS. 5A-B illustrate a system 500 configured to implement alternative OAM solutions according to this disclosure. For example, system 500 can be similar to the system 400 in some aspects, such as can including an IoT network such as the network 300. Relevant aspects of the system 500 as shown in FIGS. 5A-B include IoT devices 512A-C, an IoT gateway 545, and a fog node 540. The IoT devices 512A-C can include one or more sensors, and or other devices similar to those of the IoT devices 412A-C of FIGS. 4A-B. The IoT gateway 545 can include functionality similar to the IoT gateway 445 of FIGS. 4A-B, but with some notable differences which will be explained below. Similarly, the fog node 540 can include functionality which is similar to the fog node 440 of FIGS. 4A-B, but with some notable differences which will be explained below. In some examples, the fog node 540 can be any other node such as a cloud node, so reference can be made to a cloud/fog node 540 to illustrate such alternatives.

In some examples, the IoT devices 512A-C can be directly connected to the IoT gateway 545 where the IoT gateway 545 may include a first hop with no intermediate nodes in the IoT network between the IoT devices 512A-C and the IoT gateway 545. The IoT gateway 545 can include an ARP/ND cache with IP addresses of the IoT devices 512A-C. Using the ARP/ND cache or other mechanism, the IoT gateway 545 may track the IoT devices which are connected to the IoT gateway 545, such that those IoT devices may be monitored. The ARP/ND cache can be updated when new IoT devices are connected to or attached to the IoT gateway 545 as well as when any existing IoT devices are no longer connected or attached to the IoT gateway 545.

In system 500, the IoT gateway 545 may store the ARP/ND cache and manage a local active list of active IoT devices. IoT devices identified in the ARP/ND cache which are not in the active list are considered to be non-active and as such, candidates for directing OAM probes. By storing and managing the ARP/ND cache and the active list locally, the IoT gateway 545 is capable of directing OAM probes to the IoT devices of the ARP/ND cache which are not in the active list. Rather than transport the entire ARP/ND cache as in system 400, the IoT gateway 545 of system 500 can share only the prefixes of the IP addresses (or other identifiers) with the cloud/fog node 540. This way the cloud/fog node 540 may be made aware of the IoT devices 512A-C connected to the IoT gateway 545.

In an illustrative example referring to FIG. 5A, the IoT device 512A may have sent a message within a time period of interest to the IoT gateway 545, which may enable the IoT gateway 545 to identify the IoT device 512A as belonging to the active list. The IoT gateway 545 can exclude the IoT device 512A from OAM probes for that time period.

The cloud/fog node 540 can provide a variation of an OAM probe which may allow the IoT gateway 545 to have more control of identifying which one of the IoT devices 512A-C to forward the OAM probe to. For example, Internet Control Message Protocol version 6 (ICMPv6) message 562 provided by the cloud/fog node 540 to the IoT gateway 545 can identify the originator of the message 562 (e.g., the cloud/fog node 540) and a destination which identifies the IoT gateway 545. In some examples, the IP address prefixes for particular IoT devices 512A-B can be included in the message 562 in case the OAM is intended for specific IoT devices and not necessarily for all IoT devices connected to the IoT gateway identified in the destination field of the message 562.

Upon receiving the message 562, the IoT gateway 545 may consult the active list and filter out OAM probes to any IoT devices in the active list. For example, the IoT gateway 545 may filter out OAM probes to the IoT device 512A in the active list. If there are any IoT devices 512A-B in the ARP/ND cache which are not in the active list (e.g., the IoT devices 512B-C), the IoT gateway 545 can generate specific OAM messages 562B-C directed to such IoT devices not in the active list. If the OAM message 562 identifies individual IoT devices then the IoT gateway 545 may generate a corresponding OAM message to the identified IoT devices if they are not in the active list.

In the example shown, the OAM messages 562B-C can be supplied to the IoT devices 512B-C, where the OAM messages 562B-C can include ICMPv6 messages which identify the IoT devices 512B-C as the destination and the IoT gateway 545 as the originator.

Referring now to FIG. 5B, the IoT devices 512B-C, having received the OAM messages 562B-C, can generate the messages 564B-C in response. The IoT gateway 545 can receive the messages 564B-C, and if they were received during the time period, move the respective IoT devices 512B-C to the active list. Any subsequent OAM probes during the time period may not be forwarded to an IoT device in the active list, thus saving related power and resource expenses for the active IoT devices.

Further, the IoT gateway 545 can report back a consolidated message 564 to the cloud/fog node 540 which includes a list of the active IoT devices. If there are passive devices during the time period, the IoT gateway 545 can also provide the passive list containing any passive IoT device to the cloud/fog node 540. For the remainder of the time period or for subsequent time periods, the cloud/fog node 540 can identify any IoT device which is not active as being a potential candidate for future OAM probes.

Figure 6:
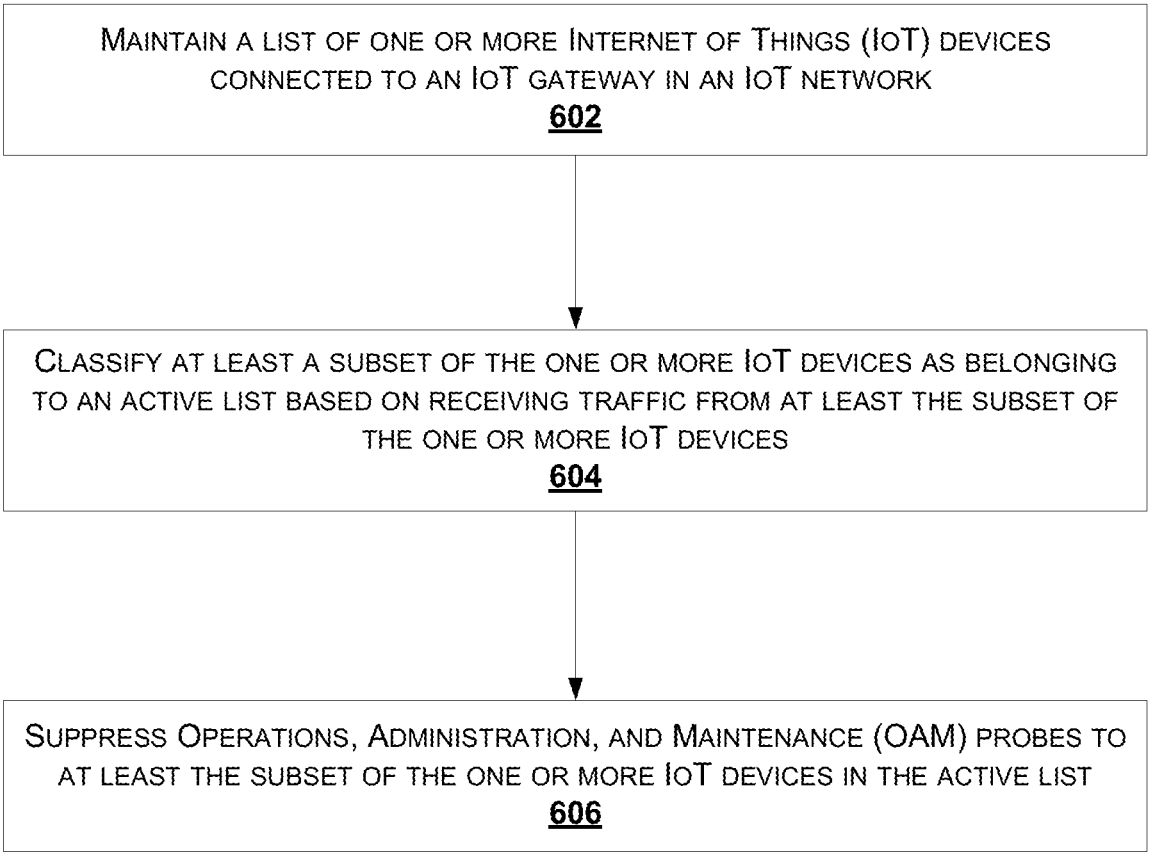
FIG. 6 illustrates a flow-chart for a process of traffic aware OAM in an IoT network, in accordance with some examples.

FIG. 6 illustrates a process 600 for Operations, Administration, and Maintenance (OAM) solutions in an IoT network (e.g., implemented in the systems 400, 500).

At step 602, the process 600 includes maintaining a list of one or more Internet of Things (IoT) devices connected to an IoT gateway in an IoT network. For example, the IoT gateway 445,545 can maintain a list of source addresses (e.g., IP addresses) of the one or more IoT devices 412A-C, 512A-C respectively in an ARP/ND cache of the IoT gateway.

At step 604, the process 600 includes classifying at least a subset of the one or more IoT devices as belonging to an active list based on receiving traffic from at least the subset of the one or more IoT devices. For example, the IoT gateway 445 can forward the cache to an intermediate node of the IoT network such as the fog node 440, where the classifying is performed at the fog node 440. The fog node 440 can suppress OAM probes to the IoT device 412A in the active list and direct an OAM probe to at least one IoT device (e.g., IoT devices 412B-C) of the one or more IoT devices, the at least one IoT device not belonging to the subset of the one or more IoT devices in the active list, but rather belonging to the passive list.

In alternative examples, the IoT gateway 545 can retain the list of IoT devices 512A-C in the ARP/ND cache receive one or more OAM probes (e.g., in the form of the message 562) from an intermediate node such as the cloud/fog node 540 and suppress at least one OAM probe of the one or more OAM probes, the at least one OAM probe for at least one IoT device (e.g., IoT devices 512B-c) not in the active list.

In some examples, classifying at least the subset of the one or more IoT devices as belonging to the active list is performed during a time period and suppressing the OAM probes to at least the subset of the one or more IoT devices in the active list is during the same time period. In some examples, the IoT gateway or the intermediate node can receive a message in response to the OAM probe from the at least one IoT device (e.g., the message 464 or 564B-C), and upon receiving the message, classify a corresponding at least one IoT device as belonging to the active list.

Figure 7:
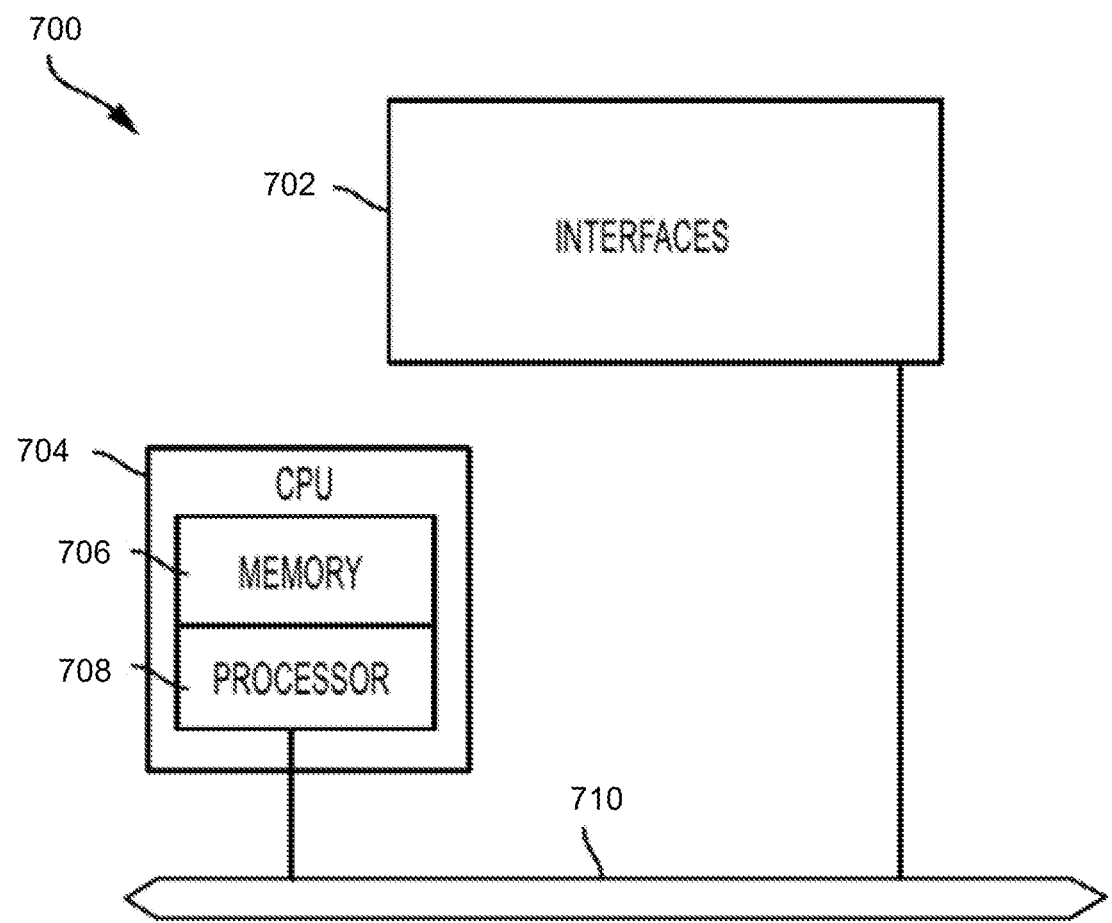
FIG. 7 illustrates a network device, in accordance with some examples.

FIG. 7 illustrates an example network device 700 suitable for implementing the aspects according to this disclosure. In some examples, the IoT devices, gateway, cloud node, fog node, or others discussed in example systems may be implemented according to the configuration of the network device 700. The network device 700 includes a central processing unit (CPU) 704, interfaces 702, and a connection 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. The CPU 704 may include one or more processors 708, such as a processor from the INTEL X86 family of microprocessors. In some cases, processor 708 can be specially designed hardware for controlling the operations of the network device 700. In some cases, a memory 706 (e.g., non-volatile RAM, ROM, etc.) also forms part of the CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 704 to efficiently perform routing computations, network diagnostics, security functions, etc.

Although the system shown in FIG. 7 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the connection 710, to exchange data and signals and coordinate various types of operations by the network device 700, such as routing, switching, and/or data storage operations, for example.

Figure 8:
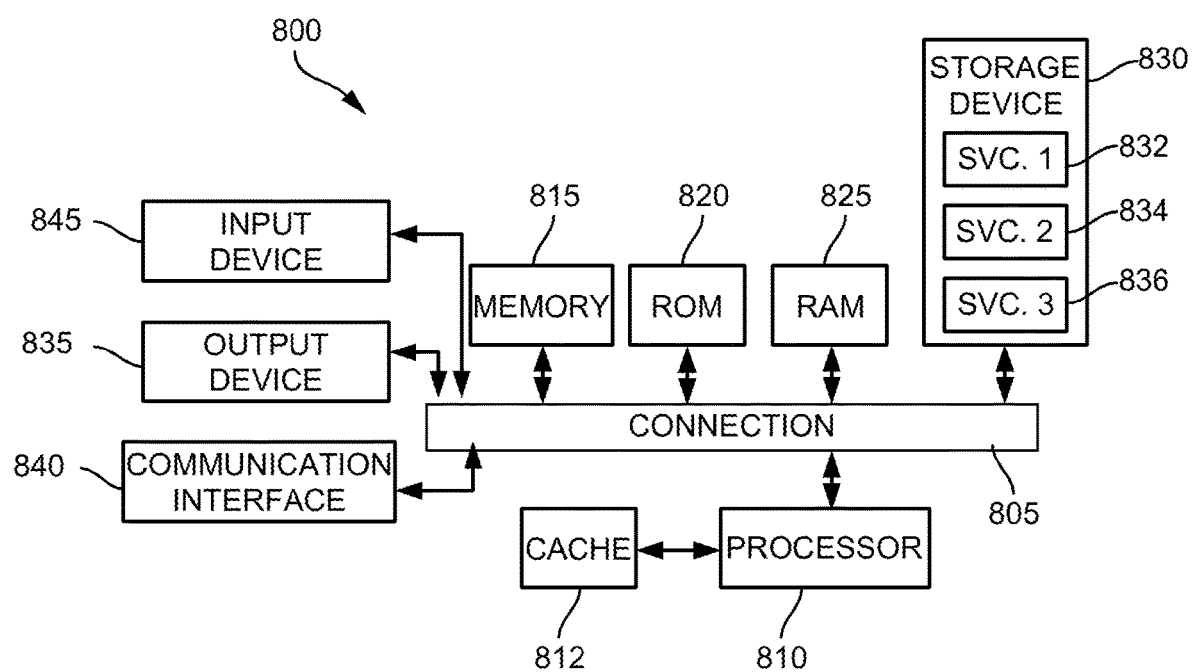
FIG. 8 illustrates an example computing device architecture, in accordance with some examples.

FIG. 8 illustrates an example computing device architecture 800 of an example computing device which can implement the various techniques described herein. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device, etc. In some instances, multimodal computing devices can enable a user to provide multiple types of input to communicate with the computing device architecture 800. The communications interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include services 832, 834, 836 for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:
1. A method comprising:
maintaining a list of one or more Internet of Things (IoT) devices connected to an IoT gateway in an IoT network;

classifying at least a subset of the one or more IoT devices as belonging to an active list based on receiving traffic from at least the subset of the one or more IoT devices; and suppressing Operations, Administration, and Maintenance (OAM) probes to at least the subset of the one or more IoT devices in the active list.

2. The method of claim 1, comprising classifying at least the subset of the one or more IoT devices as belonging to the active list during a time period and suppressing the OAM probes to at least the subset of the one or more IoT devices in the active list during the time period.

3. The method of claim 1, further comprising:
directing an OAM probe to at least one IoT device of the one or more IoT devices, the at least one IoT device not belonging to the subset of the one or more IoT devices.

4. The method of claim 3, further comprising:
receiving a message in response to the OAM probe from the at least one IoT device, and upon receiving the message, classifying the at least one IoT device as belonging to the active list.

5. The method of claim 1, wherein maintaining the list of the one or more IoT devices connected to the IoT gateway comprises maintaining a list of source addresses of the one or more IoT devices in a cache of the IoT gateway.

6. The method of claim 5, further comprising:
forwarding the cache to an intermediate node of the IoT network, wherein the classifying is performed at the intermediate node, the intermediate node comprising a cloud node or a fog node; and
receiving, from the intermediate node, at least one OAM probe for at least one IoT device not in the active list.

7. The method of claim 5, further comprising:
receiving, at the IoT gateway, one or more OAM probes from an intermediate node, the intermediate node comprising a cloud node or a fog node; and
suppressing, at the IoT gateway, at least one OAM probe of the one or more OAM probes, the at least one OAM probe for at least one IoT device not in the active list.

8. A system comprising:
one or more processors; and
a non-transitory computer-readable storage medium containing instructions which, when executed on the one or more processors, cause the one or more processors to perform operations including:
maintaining a list of one or more Internet of Things (IoT) devices connected to an IoT gateway in an IoT network;
classifying at least a subset of the one or more IoT devices as belonging to an active list based on receiving traffic from at least the subset of the one or more IoT devices; and
suppressing Operations, Administration, and Maintenance (OAM) probes to at least the subset of the one or more IoT devices in the active list.

9. The system of claim 8, comprising classifying at least the subset of the one or more IoT devices as belonging to the active list during a time period and suppressing the OAM probes to at least the subset of the one or more IoT devices in the active list during the time period.

10. The system of claim 8, wherein the operations further comprise:
directing an OAM probe to at least one IoT device of the one or more IoT devices, the at least one IoT device not belonging to the subset of the one or more IoT devices.

11. The system of claim 10, wherein the operations further comprise:

receiving a message in response to the OAM probe from the at least one IoT device, and upon receiving the message, classifying the at least one IoT device as belonging to the active list.

12. The system of claim 8, wherein maintaining the list of the one or more IoT devices connected to the IoT gateway comprises maintaining a list of source addresses of the one or more IoT devices in a cache of the IoT gateway.

13. The system of claim 12, wherein the operations further comprise:
forwarding the cache to an intermediate node of the IoT network, wherein the classifying is performed at the intermediate node, the intermediate node comprising a cloud node or a fog node; and
receiving, from the intermediate node, at least one OAM probe for at least one IoT device not in the active list.

14. The system of claim 12, wherein the operations further comprise:
receiving, at the IoT gateway, one or more OAM probes from an intermediate node, the intermediate node comprising a cloud node or a fog node; and
suppressing, at the IoT gateway, at least one OAM probe of the one or more OAM probes, the at least one OAM probe for at least one IoT device not in the active list.

15. A non-transitory machine-readable storage medium, including instructions configured to cause a data processing apparatus to perform operations for controlling context-based access of data, the operations including:
maintaining a list of one or more Internet of Things (IoT) devices connected to an IoT gateway in an IoT network;
classifying at least a subset of the one or more IoT devices as belonging to an active list based on receiving traffic from at least the subset of the one or more IoT devices; and
suppressing Operations, Administration, and Maintenance (OAM) probes to at least the subset of the one or more IoT devices in the active list.

16. The non-transitory machine-readable storage medium of claim 15, wherein the operations further comprise:
directing an OAM probe to at least one IoT device of the one or more IoT devices, the at least one IoT device not belonging to the subset of the one or more IoT devices.

17. The non-transitory machine-readable storage medium of claim 16, wherein the operations further comprise:
receiving a message in response to the OAM probe from the at least one IoT device, and upon receiving the message, classifying the at least one IoT device as belonging to the active list.

18. The non-transitory machine-readable storage medium of claim 15, wherein maintaining the list of the one or more IoT devices connected to the IoT gateway comprises maintaining a list of source addresses of the one or more IoT devices in a cache of the IoT gateway.

19. The non-transitory machine-readable storage medium of claim 18, wherein the operations further comprise:
forwarding the cache to an intermediate node of the IoT network, wherein the classifying is performed at the intermediate node, the intermediate node comprising a cloud node or a fog node; and
receiving, from the intermediate node, at least one OAM probe for at least one IoT device not in the active list.

20. The non-transitory machine-readable storage medium of claim 18, wherein the operations further comprise:
receiving, at the IoT gateway, one or more OAM probes from an intermediate node, the intermediate node comprising a cloud node or a fog node; and suppressing, at the IoT gateway, at least one OAM probe of the one or more OAM probes, the at least one OAM probe for at least one IoT device not in the active list.

\* \* \* \* \*